July 5, 1966 J. ROSÁN 3,259,161
FASTENER WITH CAPTIVE LOCKING RING
Filed Nov. 12, 1963 2 Sheets-Sheet 2
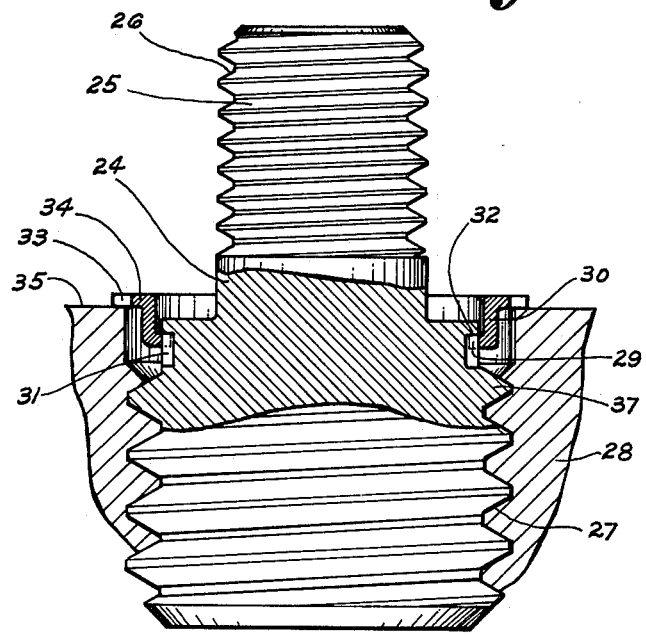
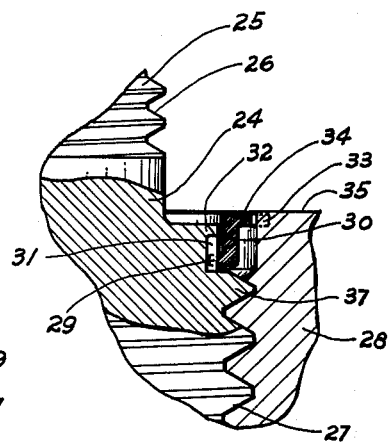
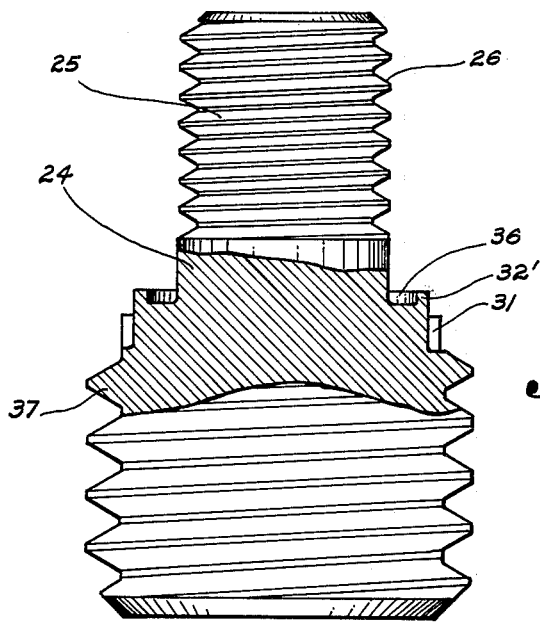
INVENTOR.
José Rosán
BY
ATTORNEY United States Patent Office 3,259,161
Patented July 5, 1966

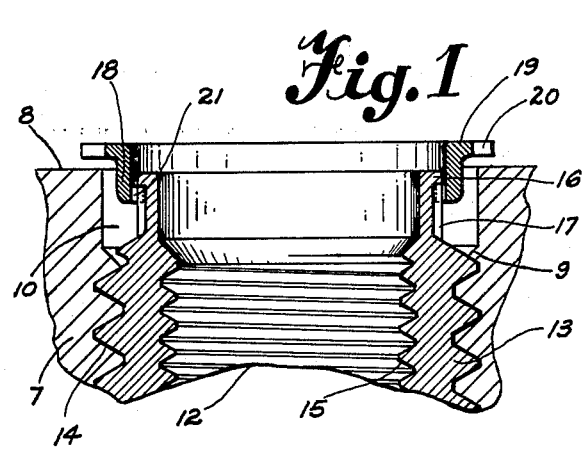
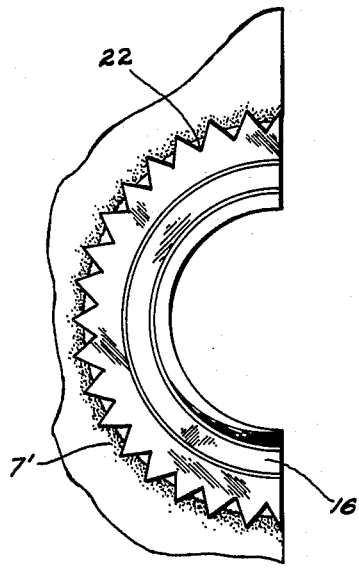
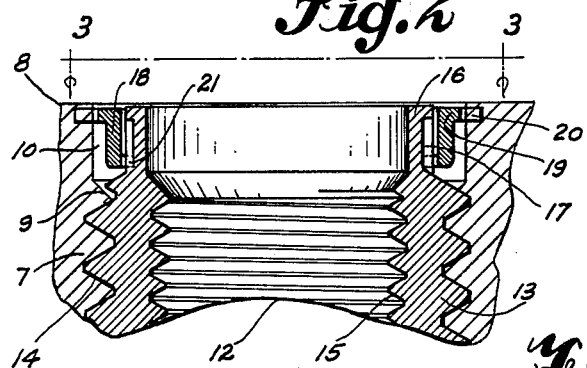
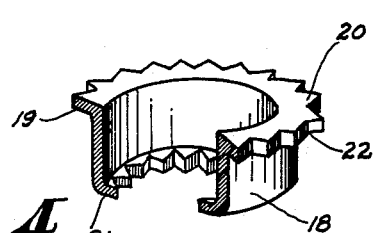
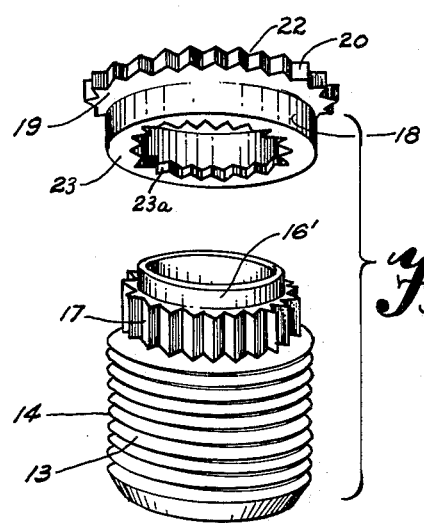
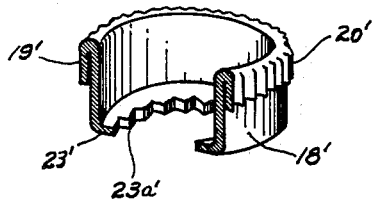

3,259,161
FASTENER WITH CAPTIVE LOCKING RING
José Rosán, San Juan Capistrano, Calif., assignor to Rósan Engineering Corp., Newport Beach, Calif., a corporation of California
Filed Nov. 12, 1963, Ser. No. 322,878
5 Claims. (Cl. 151—41.73)

This invention relates to insert type fasteners designed for installation in bores of relatively softer material and to a method of making and using same. More particularly, the invention concerns an insert type fastener which includes a cylindrical body having a nondisengageable locking ring slidably attached thereto adapted to lock said body against relative rotation with a workpiece and with a method of making and using such a fastener.

Heretofore, insert type fasteners with locking rings have generally been characterized by the fact that the fastener body and locking ring are supplied and installed as separate components. The fastener body is then conventionally installed in threaded engagement with a corresponding threaded bore of a workpiece and a separate ring is then aligned with the fastener body and driven into a counterbore at one end of said bore to lock the fastener body against rotation in said bore. Because the locking rings and fastener bodies are provided as separate components, the stocking, assembly and installation of said separate components are expensive, time consuming and laborious tasks which materially increase the cost incident to the utilization of such fasteners.

Having the fastener bodies and locking rings as separate components has other important disadvantages, in that great care is necessary to insure that the locking ring is properly aligned with the fastener body and simultaneously properly aligned with the bore in the workpiece.

The present invention comprises a fastener having an externally threaded cylindrical body which is provided with a plurality of longitudinal serrations on the periphery thereof and an outwardly extending radial flange or lip adjacent said longitudinal serrations. The fastener body is engaged by a locking ring which is provided with a plurality of inwardly extending projections that are adapted to engage the serrations carried by the fastener body. The locking ring is also provided with serrations on the outer periphery of the ring edge opposite said internal serrations.

The external serrations carried by the locking ring are embedded into the surface of the workpiece material surrounding the counterbore upon the application of an axial force thereon, thereby prohibiting rotation of the locking ring relative to said workpiece. Because of the engagement of the inwardly extending projections carried by the locking ring with the longitudinal serrations provided by the fastener body, the fastener body is likewise prohibited from rotation relative to the workpiece.

The inwardly extending projections carried by the locking ring are in slidable engagement with the longitudinal serrations provided by the fastener body. Consequently, when an axial force is applied upon the locking ring so as to embed same into the workpiece, the seating of the locking ring is independent of the body of the fastener. That is, the body remains stationary and unaffected while the locking ring is being driven into locking position. Thus, the possibility of damage or distortion of the external threads of the fastener or the threads of the bore in the parent material is eliminated.

The flange or lip adjacent the longitudinal serrations provided by the fastener body is generally rolled over from a longitudinal to a lateral position after the locking ring is inserted over the fastener body. This flange or lip coacting with the inwardly extending projections of the locking ring prevents axial disengagement of the locking ring from the fastener body.

Thus, another important feature of the present invention is that a self-contained unit is provided consisting of a fastener body and a prealigned locking ring.

Accordingly, the principal object of the invention is to provide an improved, simple, self-contained fastener of inexpensive construction having a locking ring in simultaneous prealigned relationship with the fastener body and workpiece bore and capable of being installed and locked into place by extremely inexpensive tools.

Another object of the invention is to provide a fastener capable of having the fastener body stationary and unaffected while the locking ring is embedded into locking position.

A further object is to provide a special insert type fastener embodying a stud.

A still further object is to provide a method of using a prealigned lockable fastener.

Another object of the invention is to provide a method for making a self-contained, nondisengageable, lockable fastener.

Still another object of the invention is to provide a method for making a prealigned, nondisengageable, lockable fastener.

Other objects and advantages of the invention will become apparent from the following descriptions taken in conjunction with the accompanying drawings, in which:

FIG. 1 is a greatly enlarged fragmentary sectional view of a fastener embodying the principles of the present invention;

FIG. 2 is a greatly enlarged fragmentary sectional view of the fastener of FIG. 1, showing the locking ring axially displaced into locking position;

FIG. 3 is a greatly enlarged fragmentary plan view taken on the line 3—3 of FIG. 2, showing the workpiece material displaced into the serration root cavities of the locking ring;

FIG. 4 is an enlarged perspective view, partly in section, of a locking ring of the type described herein, having inwardly projecting serrations which are adapted to engage the external serrations of the fastener body;

FIG. 5 is a perspective view, showing the fastener body prior to flaring out or rolling over the body end and showing the locking ring positioned to be inserted over the fastener body;

FIG. 6 is a modified embodiment of the locking ring wherein the outwardly projecting flange is outwardly and downwardly extended in a longitudinal direction and serrated at the outer surface of said flange and the locking ring is provided with an inwardly projecting serrated flange;

FIG. 7 is a greatly enlarged fragmentary sectional view of a stud type fastener embodying the principles of the present invention;

FIG. 8 is a greatly enlarged fragmentary sectional view of the fastener of FIG. 7, showing the locking ring axially displaced into locking position; and FIG. 9 is a greatly enlarged fragmentary sectional view of a stud type fastener, showing the fastener body prior to flaring out or rolling over of the annular flange.

Referring more particularly to FIG. 1, numeral 7 designates generally a workpiece having an outer surface 8. As illustrated, the workpiece 7 is formed with a threaded bore 9 extending inwardly from the outer surface 8 and an enlarged cylindrical counterbore 10, extending inwardly from workpiece surface 8 to a predetermined depth.

The fastener is constructed of any suitable material relatively harder than the workpiece 7 and is generally identified by the numeral 12, said fastener comprising cylindrical body 13 provided with external threads 14 and a threaded bore 15. In FIG. 1 the fastener body 13 is shown threaded into bore 9 of workpiece 7.

The fastener body 13 has an integral radial flange 16 and longitudinal serrations 17. Fastener 12 is further provided with a locking ring which is generally designated by numeral 18. Locking ring 18 has an outwardly projecting radial flange 19 which is provided with serrations 20, as shown in FIGS. 1, 2, 3 and 4. Locking ring 18 is also provided with inwardly extending projections 21, which may consist of a plurality of longitudinal serrations as in FIGS. 1, 2 and 4, or an inwardly projecting serrated radial flange 23, as shown in FIGS. 5 and 6.

The axial movement of locking ring 18 is restricted by the engagement of locking ring projections 21 by the body flange 16 when the locking ring is in the position ring projections 21 thus prevents axial disengagement of the locking ring from the fastener body. The engagement of the locking ring projections 21 with longitudinal serrations 17 of fastener body 13 permits only axial movement of the locking ring with respect to the fastener body. Thus, not only is the locking ring in captive association with the fastener body so as to provide a self-contained unit, but the locking ring is also simultaneously maintained in preset alignment with the fastener body and the workpiece counterbore, thereby facilitating the installation of the fastener unit.

In FIG. 2, the fastener 12 of FIG. 1 is shown fully installed in workpiece 7. The fastener body 13 is threaded in bore 9 of workpiece 7 and locking ring 18 has been longitudinally displaced by the application of an axial force thereon, which can be provided by a tool or the like adapted therefor. By application of the aforesaid axial force, flange serrations 20 are thereby embedded in surface 8 of workpiece 7, and the inwardly extending projections 21 carried by the locking ring 18 are simultaneously displaced in a longitudinal direction being guided in said direction by the engagement of said projections 21 with the serrations 17 provided by the fastener body.

Embedding locking ring serrations 20 into surface 8 of workpiece 7 displaces the workpiece material 7' into the root cavities 22, as shown in FIG. 3. The displaced material 7' is thus "cold-worked" and hardened (as shown by stippling in FIG. 3), thereby creating greater resistance to subsequent torque forces.

The engagement of locking ring projections 21 with serrations 17 of body 13, also prohibits rotation of body 13 relative to locking ring 18 and workpiece 7. Thus the threaded connection of the fastener body 13 with threaded bore 9 of the workpiece, and the engagement of the inwardly extending projections 21 of locking ring 18 with the external serrations 17 of the fastener body in conjunction with the simultaneous embedding of the flange serrations 20 of locking ring 18 into the workpiece surface, all interact to provide a fastener securely locked in a workpiece against rotational and axial displacement. The locking ring of FIGS. 1 and 2 is more clearly illustrated in FIG. 4. The locking ring 18 is provided with an outwardly projecting flange 19 having serrations 20. The locking ring is further provided with internal serrations 21. As hereinabove described, the flange serrations 20 and the internal serrations 21 coact with the workpiece material and the fastener body, respectively, to lock the fastener into the workpiece bore against subsequent rotational movement.

FIG. 5 is a perspective view of a fastener embodying the principles of the present invention, in which the fastener body is shown prior to the flaring out or rolling over of end 16' of the fastener body 13. In FIG. 5, locking ring 18, in which the inwardly extending projections consist of flange 23 provided with serrations 23a, is positioned to be inserted over the fastener body 13, prior to the aforesaid flaring out or rolling over of end 16'. After locking ring 18 is inserted over said end 16' of body 13, end 16' is flared out or rolled over so as to form a lip or flange 16, as shown in FIGS. 1 and 2. Lip or flange 16 thus coacts with inwardly extending flange 23 of locking ring 18, thereby preventing axial disengagement of the locking ring from fastener body 13.

Another embodiment of the locking ring of the present invention is shown in FIG. 6 by numeral 18', in which the outwardly extending flange 19 of FIG. 5, outwardly and downwardly extends in a longitudinal direction to form flange 19'. Serrations 20' are then preferentially formed on the outer longitudinal surface of said flange 19'. The locking ring 18' of FIG. 6 also has inwardly extending projections which consist of flange 23' provided with serrations 23a'.

FIG. 7 is an illustration of a stud-type fastener embodying the principles of the invention in which the fastener body, designated generally by the numeral 24, is solid rather than tubular and is provided with threads 37 and an integral longitudinally projecting shank 25, said shank being provided with threads 26. The fastener is shown in FIG. 8 installed in a bore 27 of workpiece 28. Inwardly extending projections 29 of locking ring 30 of the type hereinabove described in FIG. 4, engage the longitudinal serrations 31 of said fastener. Said locking ring is thus prevented from axial disengagement from body 24 by the coaction of inwardly extending projections 29 with annular body flange 32.

In FIG. 8, the stud-type fastener of FIG. 7 is shown fully installed in bore 27 of workpiece 28. The fastener body 24 is threaded into workpiece 28 and locking ring 30 has been longitudinally displaced by the application of an axial force as hereinbefore described, thereby embedding the serrations 33 of flange 34 provided by locking ring 30 into the surface 35 of workpiece 28, as hereinabove described with respect to FIG. 2.

FIG. 9 is an enlarged fragmentary sectional view of a stud-type fastener, showing the fastener body 24 provided with annular groove 36 prior to flaring out or rolling over of the annular flange 32' and prior to emplacing a locking ring 30 of the types shown in FIGS. 4 or 6 onto body 24.

While several embodiments of the invention and their use and method of making same have been described, it is, of course, understood that the particular embodiments of the invention herein disclosed are for illustrative purposes only and that various changes may be made therein, without departing from the principles of the invention or the scope of the annexed claims.

I claim:

1. A fastener adapted to be installed in a bore in a workpiece, the combination of:
    a cylindrical body, said body provided with a plurality of serrations on the outer periphery thereof;
    a locking ring, said locking ring provided with a plurality of serrations on the outer periphery thereof and provided with inwardly extending serrations on the internal periphery thereof, said serrations being in constant axial slidable engagement with the serrations of said body, thereby providing preset alignment with said bore;
    means for securing said locking ring to said body comprised of an outwardly projecting flange provided by said body adapted to coact with the said internal locking ring overlying the crests of the serrations so as to prevent axial disengagement of said locking ring from said body.

2. A fastener comprising:
    an externally threaded cylindrical body, said body provided with a plurality of longitudinally extending serrations on the outer periphery thereof, said serrations extending at least the longitudinal length of a coacting locking ring;
    a portion of said body forming an integral radial flange outwardly projecting from said body, said flange positioned adjacent the upper extremities of said body serrations;
    a locking ring;

an integral radial flange outwardly projecting from the upper edge of said locking ring, said flange provided with a plurality of serrations on the outer periphery thereof;

a second integral radial flange inwardly projecting from the bottom edge of said locking ring positioned below said body flange, said flange provided with a plurality of serrations on the innermost edge thereof, said serrations being in constant axial slidable engagement with the serrations of said body, said serrations provided by said inwardly projecting flange adapted to coact with said body flange so as to prevent axial disengagement of said locking ring from said body.

3. A fastener as described in claim 2, wherein said outwardly projecting radial flange of said locking ring is disposed outwardly and downwardly in a substantially longitudinal direction and provided with a plurality of serrations on the outer surface of said flange.

4. A fastener comprising:

an externally threaded tubular body, said body provided with internal threads and with a plurality of longitudinally extending serrations at one end thereof, said serrations extending at least the longitudinal length of a coacting locking ring;

a portion of said body forming an integral radial flange outwardly projecting from said body, said flange positioned adjacent the upper extremities of said body serrations;

a locking ring;

an integral radial flange outwardly projecting from the upper edge of said locking ring, said flange provided with a plurality of serrations on the outer periphery thereof;

a second integral radial flange inwardly projecting from the bottom edge of said locking ring positioned below said body flange, said flange provided with a plurality of serrations on the innermost edge thereof, said serrations being in constant axial slidable engagement with the serrations of said body, said serrations provided by said inwardly projecting flange adapted to coact with said body flange so as to prevent axial disengagement of said locking ring from said body.

5. A fastener as described in claim 4, wherein said outwardly projecting radial flange of said locking ring is disposed outwardly and downwardly in a substantially longitudinal direction and provided with a plurality of serrations on the outer surface of said flange.

References Cited by the Examiner

UNITED STATES PATENTS

| | | | |
|---|---|---|---|
| 2,318,590 | 5/1943 | Boynton | 151—8 |
| 2,400,318 | 5/1946 | Rosan | 151—41.73 |
| 2,435,466 | 2/1948 | Thomas | 85—32 |
| 2,716,762 | 9/1955 | Stern | 10—155.5 |
| 2,730,732 | 1/1956 | Nielsen | 10—155.5 |
| 2,788,830 | 4/1957 | Rosan | 151—41.73 |
| 2,886,090 | 5/1959 | Rosan | 151—41.73 |
| 2,958,358 | 11/1960 | Neuschotz | 151—57 |
| 3,124,189 | 3/1964 | Dietlein | 151—41.73 |
| 3,130,765 | 4/1964 | Neuschotz | 151—23 |
| 3,179,144 | 4/1965 | Brown | 151—41.73 |

CARL W. TOMLIN, *Primary Examiner.*

EDWARD C. ALLEN, *Examiner.*

M. PARSONS, JR., *Assistant Examiner.*